(No Model.)

B. BANNISTER.
Flexible Harrow and Cultivator Frame.

No. 236,974.        Patented Jan. 25, 1881.

UNITED STATES PATENT OFFICE.

BURR BANNISTER, OF KALAMAZOO, MICHIGAN, ASSIGNOR OF TWO-THIRDS TO ESEK W. SLEEPER AND HALE P. KAUFFER, OF SAME PLACE.

FLEXIBLE HARROW AND CULTIVATOR FRAME.

SPECIFICATION forming part of Letters Patent No. 236,974, dated January 25, 1881.

Application filed July 19, 1880. (No model.)

*To all whom it may concern:*

Be it known that I, BURR BANNISTER, of Kalamazoo, in the county of Kalamazoo and State of Michigan, have invented a new and valuable Improvement in Flexible Harrow and Cultivator Frames; and I do hereby declare that the following is a full, clear, and exact description of the construction and operation of the same, reference being had to the annexed drawings, making a part of this specification, and to the letters and figures of reference marked thereon.

This invention relates to an improved flexible harrow; and it consists in a harrow composed of a series of angular sections connected by curved springs interposed between the parallel bars composing the sections, as more fully hereinafter shown and described. These objects I accomplish by the devices illustrated in the accompanying drawings, in which—

Figure 1:
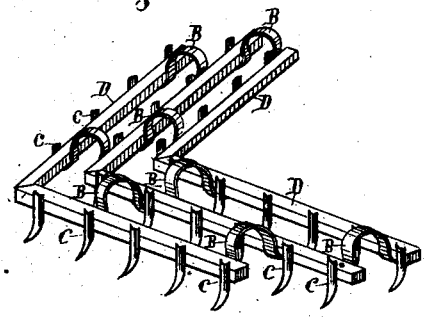
Figure 2:
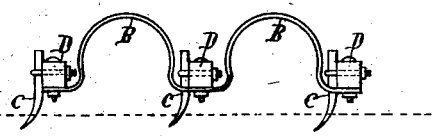

Figure 1 represents a perspective view of my improved harrow; and Fig. 2, a detailed view, showing a side elevation of the sections and their spring or flexible connections.

The letter D indicates a series of angular sections, which may be of any desired number, three being represented in the present instance. The said sections are connected together by means of a series of springs, B. The said springs are constructed of flat strips or bands of metal of requisite strength and flexibility, bent into semicircular shape, and having their ends bent outward horizontally, forming seats for the sections, the horizontal ends of the springs being perforated and the under sides of the sections secured to the upper sides of said bent ends by means of screw-bolts or other suitable fastening devices.

The letter $c$ indicates the harrow-teeth. These teeth are secured to the forward edges of the sections D, and their lower ends are curved forward in the arc of a circle parallel to the line of the circle upon which the semicircular portion of the springs B is projected. The lower extremities of the curved teeth $c$ are pointed in the usual manner. As thus constructed, it will be perceived that the teeth form, in effect, a continuation of the curved springs—that is to say, they project forward in a curved line parallel to the curve of the springs, thus causing the teeth to "take into" or enter the ground naturally as the frame is moved forward with a spring-pressure, by means of which they will be caused to enter the earth and turn it up properly, so long as they do not meet with unusual obstructions, but permitting said teeth to yield upon meeting such obstructions, or while passing over inequalities in the ground.

I am aware that yielding harrows have heretofore been constructed in which a series of rock-shafts were journaled in a suitable frame, the said shafts being provided with curved teeth and operated by spiral springs to hold the teeth to the ground, and also that horse-rakes have been employed consisting of sections connected by flat springs slightly curved, and such I specially disclaim.

What I do claim, however, and desire to secure by Letters Patent, is—

A flexible harrow composed of a series of angular sections and connected by curved flat springs interposed between the parallel bars, substantially as described.

BURR BANNISTER.

Witnesses:
LAWRENCE N. BURKE,
HENRY C. BRIGGS.